March 2, 1926. 1,575,015
E. A. SPEEGLE
BED ATTACHMENT FOR AUTOMOBILES
Filed June 23, 1925
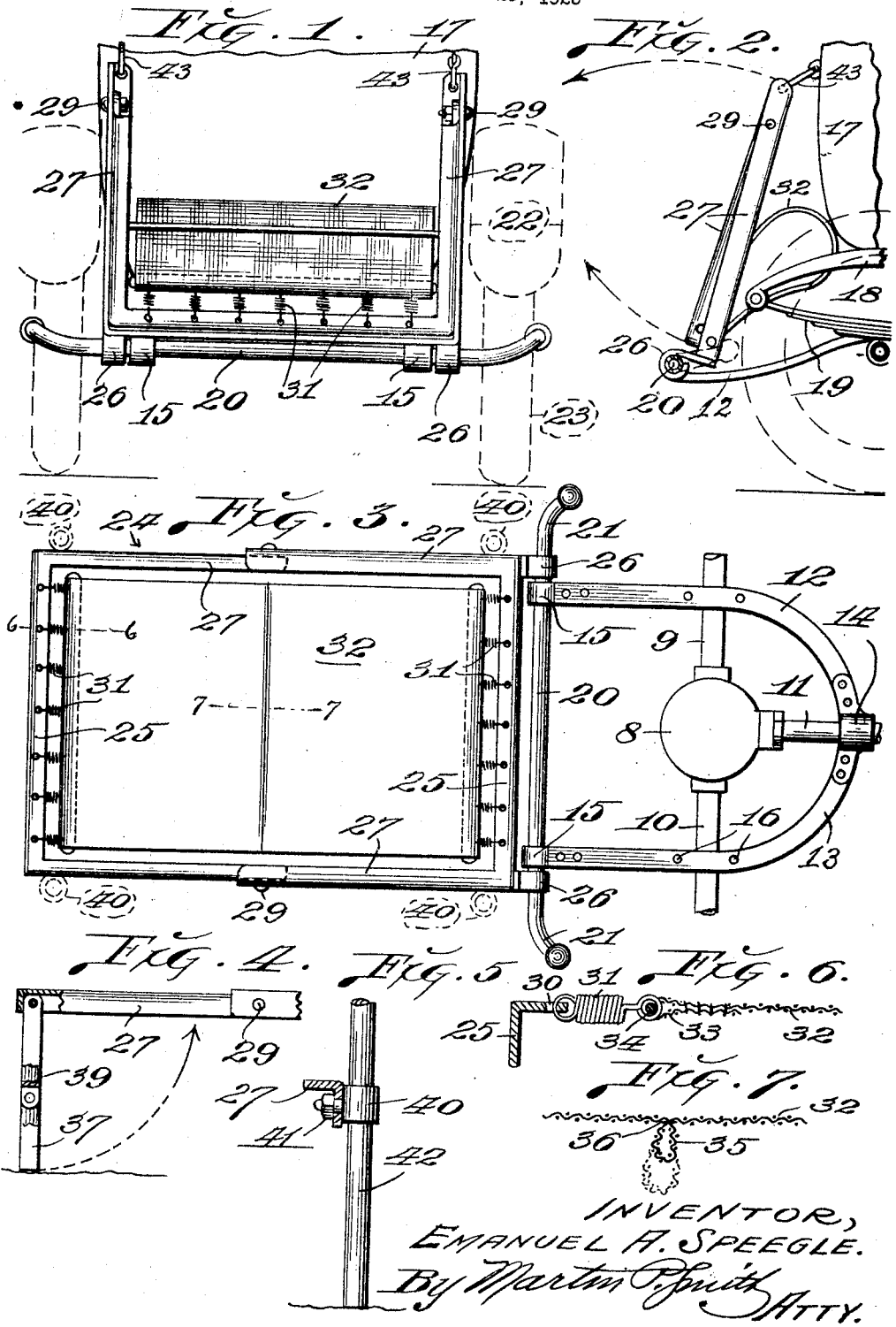

Patented Mar. 2, 1926.

1,575,015

UNITED STATES PATENT OFFICE.

EMANUEL A. SPEEGLE, OF LOS ANGELES, CALIFORNIA.

BED ATTACHMENT FOR AUTOMOBILES.

Application filed June 23, 1925. Serial No. 39,020.

*To all whom it may concern:*

Be it known that I, EMANUEL A. SPEEGLE, a citizen of the United States, residing at Los Angeles, in the county of Los Angeles and State of California, have invented certain new and useful Improvements in Bed Attachments for Automobiles, of which the following is a specification.

The present invention relates to bed attachments for automobiles, and pertains more particularly to an improved portable bed and means for attaching same to an automobile.

The invention has for its principal object the provision of an efficient, compact and sturdy structure embodying such a bed and fastening means, with a view to providing more than usual utility.

Another object of the invention is to provide a structure of the above mentioned character which is adapted to serve as a bumper or buffer for its own protection as well as for the protection of the car to which it is applied.

Another object of the invention is to provide a bed adapted to be supported by the car, regardless of whether the bed is in open or folded position, without using the interior of the car and without interfering with or obstructing the doors or running board.

Another object of the invention is to provide for conveniently and efficiently stowing and carrying bedding and the like by means of the bed structure.

Still other objects and advantages of my invention will appear hereinafter.

I have illustrated my invention by the accompanying drawings, in which

Fig. 1 is a view in rear elevation of one embodiment of my invention as it appears in folded position attached to an automobile.

Fig. 2 is a side elevation of the parts shown in Fig. 1.

Fig. 3 is a plan view of the bed in extended position, the view being continued under the body of the car to illustrate the means for its attachment to the car.

Fig. 4 is a fragmentary view in elevation and section of an outermost corner of the bed showing a supporting leg thereof in operative position.

Fig. 5 is a detail elevation of an attachment for the bed.

Fig. 6 is a detail section as seen on a line 6—6 of Fig. 3.

Fig. 7 is a detail section seen on a line 7—7 of Fig. 2.

More specifically 8 indicates the differential housing of the rear end of a motor vehicle, from which housing extend the axle housings, 9 and 10 respectively, and the propeller shaft housing 11, the three being in cruciform arrangement. One of the essential parts of the embodiment illustrated is a U-shaped yoke, 12, the inner bent portion 13 of which is attached permanently to the axle propeller shaft housing by a shackle member 14. The free outer ends of the U-shaped yoke are bent into loops, as at 15, while the yoke is further supported intermediately by resting on the respective axle housings. Other inverted shackles, such as 14, (not shown) may be employed on the under side of the yoke to hold the yoke to the respective axle housings. Rivets such as 16 may be employed for securing said shackles.

The looped outer ends of the yoke project beyond the rear end of the body 17 of the vehicle, and said ends are even extended beyond the chassis horns 18, and the rear springs 19. In conformity with a salient feature of the invention, the said ends carry a bumper bar 20 having curved ends 21. Said ends are adapted to extend out beyond the fenders 22 and tires 23 in conformity with usual practice and the bar is adapted to serve all the purposes of a bumper bar, as well as serving other purposes apparent hereinafter.

A suitable bed 24 is provided which embodies rigid end members 25. The end member adjacent the vehicle carries a pair of spaced loops 26 which fit revolubly around the bumper bar so that the bed is pivoted to the bumper bar and relative to the yoke. Obviously the bed may be swung from horizontal position as shown in Fig. 3 to any vertical or other inclined position. Any suitable bed might be attached to the bumper bar, but the bed illustrated is a preferred construction and embodies side frame members 27 which are divided about midway of the length, as at 28 and pivoted by pins 29. Thus the bed may be folded so that the parts assume the relative positions shown in Fig. 2.

The end members of the bed frame are provided with a plurality of spaced apertures 30 in which helical springs 31 are hooked, as shown in Fig. 6; said springs serve to support and stretch a canvas or the like, 32. Said canvas has each end looped as at 33 to retain a cross bar 34, the springs being attached to said bar instead of directly to the canvas.

The canvas is made longer than necessary after which the slack is taken up, as at 35 by a stitching 36. At any future time, additional slack may be taken up in the same manner, as indicated by the broken lines in Fig. 7.

The remote end of the bed carries inwardly spring legs such as 37 tied to each other by a cross member 39. The frame members are preferably of channel iron and the legs may be moved up into the channels; the lowermost ends of the legs describing the arc indicated by the broken line and the arrow in Fig. 4. If a covering or canopy (not shown) is desired, short sleeves such as 40 may be secured to the side members of the bed as by nuts 41. Suitable staffs 42 or the like can be held in vertical position thereby to support such a canopy.

When the bed is to be folded, the frame is broken by applying force to the divided part of the side members as indicated by the vertical arrow in Fig. 4. Simultaneously the legs are swung into parallel relations to the frame members.

When the frame is reduced to one-half original length, it is moved on its axis, relative to the bumper bar into the position shown in Fig. 2. The canvas is attached to the frame only at its ends and therefore when the frame is folded said canvas is free to assume the position shown in Fig. 2, in which position, it is adapted to retain bedding, pillows and the like.

In order to retain the folded positions, as shown in Figs. 1 and 2, flexible connections such as hooks or straps 43 are arranged on the rear portion of the body of the vehicle and engage in apertures that are formed in parts of the members 27. Such construction secures the structure in folded position and at the same time permits the vehicle body and axle to which yoke 12 is connected to move vertically relative to each other.

To open or unfold the bed, hooks 43 are disengaged and the upper end of the folded frame is moved outwardly along a line indicated by the upper broken line in Fig. 2 while the lower extreme outer end of the frame is moved out along a line indicated by the lowermost broken line in Fig. 2 until the two parts of the frame occupy the same horizontal plane.

While I have shown and described specific constructions and arrangements of parts, and specific means for holding the bed in folded and extended positions, I do not limit myself to any suitable construction or arrangement of parts, or to any specific means for so holding the bed, and I may alter the constructions and arrangements, and otherwise depart from the embodiment illustrated, without enlarging the scope of my invention, as set forth in the appended claims.

I claim as my invention:

1. The combination with an automobile and its rear axle, of a U-shaped frame secured to said axle and extending rearwardly thereof, a bumper secured to the rear portion of said frame and disposed transversely to the rear of the automobile body, a rectangular bed frame formed in two parts and hinged to each other so that one part may be folded flat against the other part, one end of the inner part of said folding frame being hinged to the bumper and folding legs hinged to the outer portion of the other part of the folding bed frame.

2. The combination with an automobile and its rear axle, of a U-shaped frame secured to said axle and extending rearwardly thereof, a bumper secured to the rear portion of said frame and disposed transversely to the rear of the automobile body, a rectangular bed frame formed in two parts and hinged to each other so that one part may be folded flat against the other part, one end of the inner part of said folding frame being hinged to the bumper, folding legs hinged to the outer portion of the other part of the folding bed frame and a flexible bed bottom secured to the end rails of the two parts of the folding frame.

3. The combination with an automobile and its rear axle, of a U-shaped frame secured to said rear axle and projecting rearwardly therefrom, a bumper secured to the rear portion of said frame and occupying a transverse position to the rear of the vehicle body, a folding bed frame hinged to said bumper so as to swing upwardly and inwardly into an inclined position between the bumper and the rear portion of the vehicle body and a second bed frame member hinged to the first-mentioned bed frame member so as to lie substantially parallel therewith when the first-mentioned member is swung upwardly against the rear of the vehicle body.

4. The combination with an automobile and its rear axle, of a U-shaped frame secured to said rear axle and projecting rearwardly therefrom, a bumper secured to the rear portion of said frame and occupying a transverse position to the rear of the vehicle body, a folding bed frame hinged to said bumper so as to swing upwardly and inwardly into an inclined position between the bumper and the rear portion of the vehicle body, a second bed frame member hinged to the first-mentioned bed frame member so as to lie substantially parallel therewith when the first-mentioned member is swung upwardly against the rear of the vehicle body and a flexible bed bottom secured to the end rails of the two parts of the folding bed frame.

In testimony whereof I affix my signature.

EMANUEL A. SPEEGLE.